United States Patent
Kapocs et al.

(10) Patent No.: US 10,768,656 B1
(45) Date of Patent: Sep. 8, 2020

(54) VEHICLE BRAKE PEDAL BOOSTER PUSHROD INTERFACE ASSEMBLY

(71) Applicant: Volvo Car Corporation, Göteborg (SE)

(72) Inventors: Marcel Kapocs, Särö (SE); Mickael Larsen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/411,842

(22) Filed: May 14, 2019

(51) Int. Cl.
| | |
|---|---|
| G05G 1/30 | (2008.04) |
| F16B 2/20 | (2006.01) |
| B60T 7/02 | (2006.01) |
| G05G 1/46 | (2008.04) |
| B60T 7/04 | (2006.01) |
| F16D 131/00 | (2012.01) |

(52) U.S. Cl.
CPC .................. G05G 1/46 (2013.01); B60T 7/04 (2013.01); F16B 2/20 (2013.01); *F16D 2131/00* (2013.01)

(58) Field of Classification Search
CPC ... B60T 7/04; B60T 7/06; F16D 65/02; F16D 2065/1304; F16D 2131/00; G05G 1/44; G05G 1/46; Y10T 403/3961; Y10T 403/591; E05B 79/16; F16B 2/20; F16B 21/00; F16B 21/06; F16C 17/18
See application file for complete search history.

(56) References Cited

U.S. PATENT DOCUMENTS

| | | | | |
|---|---|---|---|---|
| 1,556,108 A | * | 10/1925 | Harbert | F16B 21/10 411/523 |
| 4,655,628 A | * | 4/1987 | Parker | B60T 7/06 403/163 |
| 5,056,938 A | * | 10/1991 | Ahlman | F16C 17/18 384/286 |
| 6,122,989 A | * | 9/2000 | Barnes | G05G 1/46 403/386 |

(Continued)

FOREIGN PATENT DOCUMENTS

| | | |
|---|---|---|
| CN | 204263946 U | 4/2015 |
| CN | 103661343 B | 4/2016 |

(Continued)

*Primary Examiner* — Adam D Rogers
(74) *Attorney, Agent, or Firm* — Clements Bernard Walker; Christopher L. Bernard

(57) ABSTRACT

A vehicle brake pedal booster pushrod interface assembly is provided that includes: a pivotable brake pedal arm including a protruding peg structure; and an elongate pushrod including a clip structure disposed at one end thereof and adapted to pivotably engage the protruding peg structure of the pivotable brake pedal arm. The brake pedal booster pushrod interface assembly further includes a cylindrical sleeve adapted to be rotatably disposed about the protruding peg structure of the pivotable brake pedal arm and be pivotably engaged by the clip structure of the elongate pushrod. Optionally, the cylindrical sleeve includes an opposed conical section disposed at either end thereof and separated by a cylindrical center portion. The clip structure of the elongate pushrod includes a pair of arms defining an opening and an interior space adapted to receive the protruding peg structure of the pivotable brake pedal arm.

18 Claims, 7 Drawing Sheets

(56) References Cited

U.S. PATENT DOCUMENTS

| | | | | |
|---|---|---|---|---|
| 6,152,642 | A | * | 11/2000 | Berthold ................ B60T 7/042 24/669 |
| 6,203,236 | B1 | * | 3/2001 | Gautier .................. B60T 11/18 403/322.1 |
| 6,470,790 | B1 | | 10/2002 | Hewitt |
| 8,479,608 | B2 | * | 7/2013 | Schonlau ............... B60T 7/042 74/512 |
| 9,010,502 | B2 | | 4/2015 | Roberts et al. |
| 2010/0251848 | A1 | * | 10/2010 | Drott ...................... B60T 7/042 74/514 |

FOREIGN PATENT DOCUMENTS

| | | | | | |
|---|---|---|---|---|---|
| CN | 108674397 | A | | 10/2018 | |
| DE | 2416110 | A1 | * | 10/1975 | ................ B60T 7/04 |
| DE | 19534225 | A1 | * | 3/1997 | ................ G06G 1/46 |
| DE | 19932744 | A1 | * | 2/2001 | ............. F16B 21/065 |
| FR | 2906327 | A1 | * | 3/2008 | ................ G06G 1/46 |

* cited by examiner

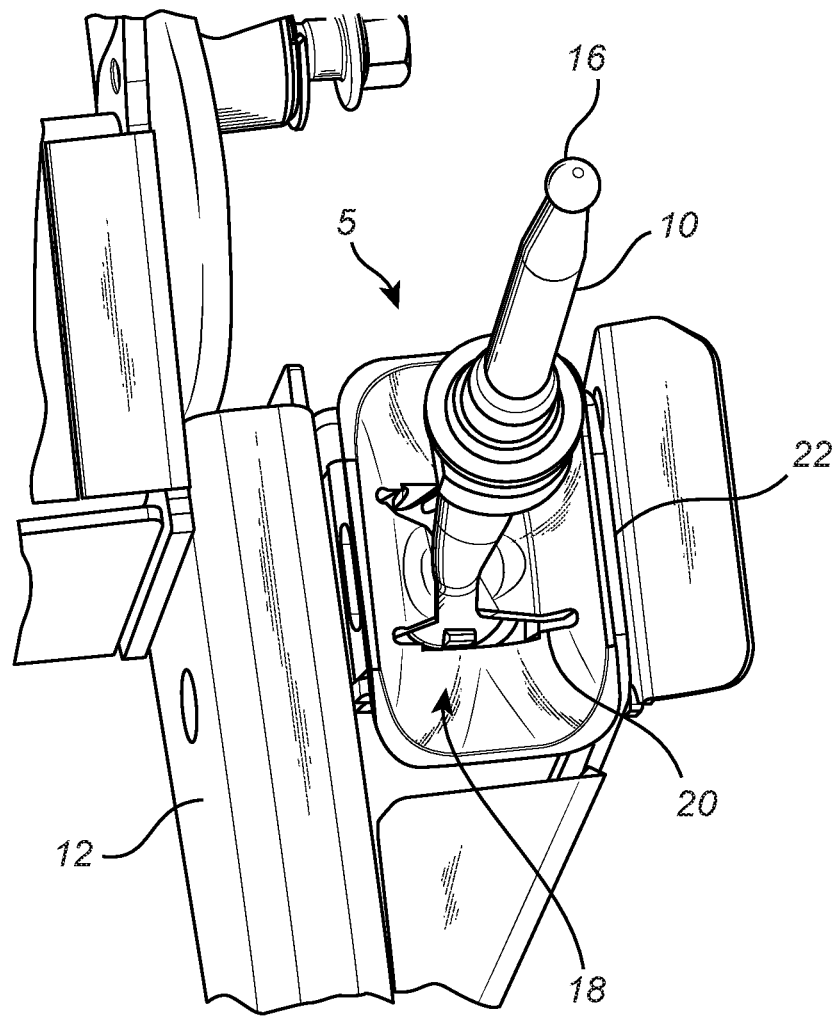
(Prior art) Fig. 1

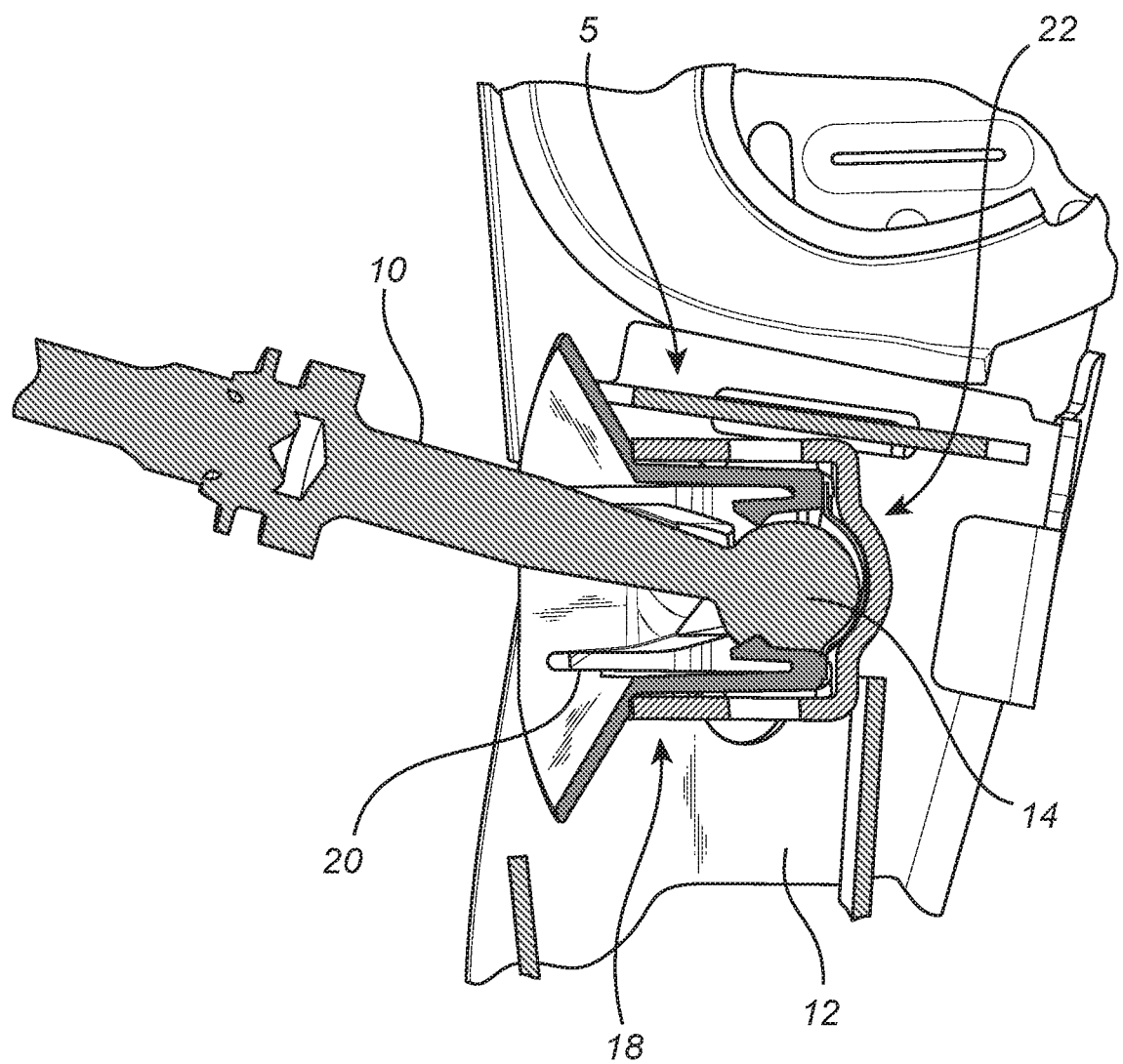
(Prior art) Fig. 2

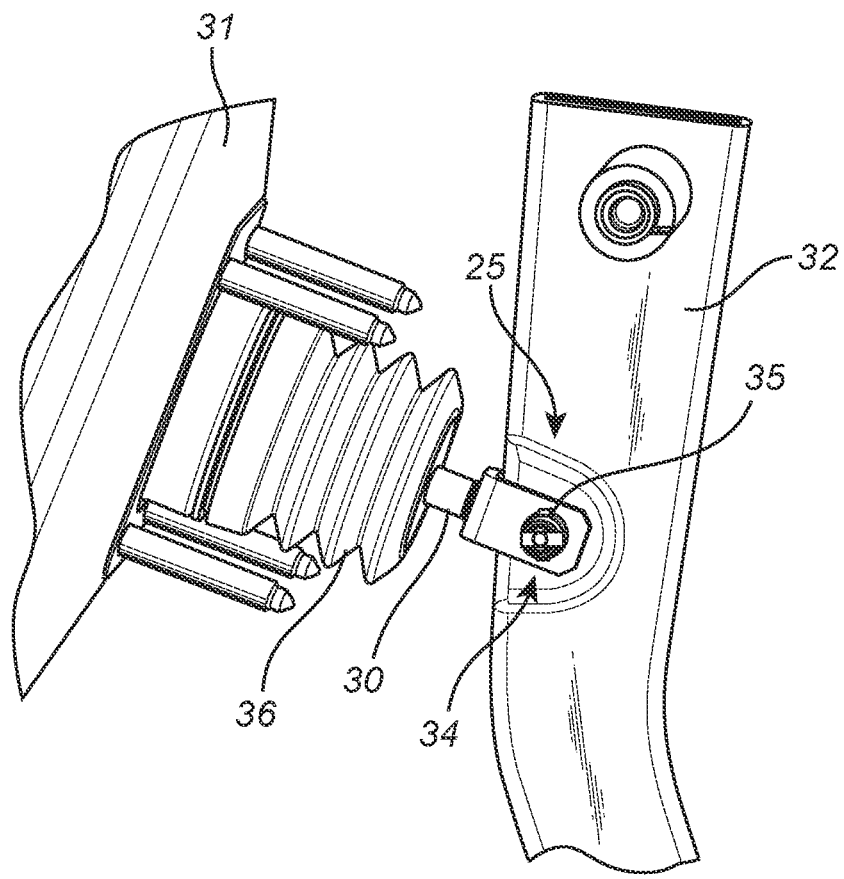
(Prior art) *Fig. 3*
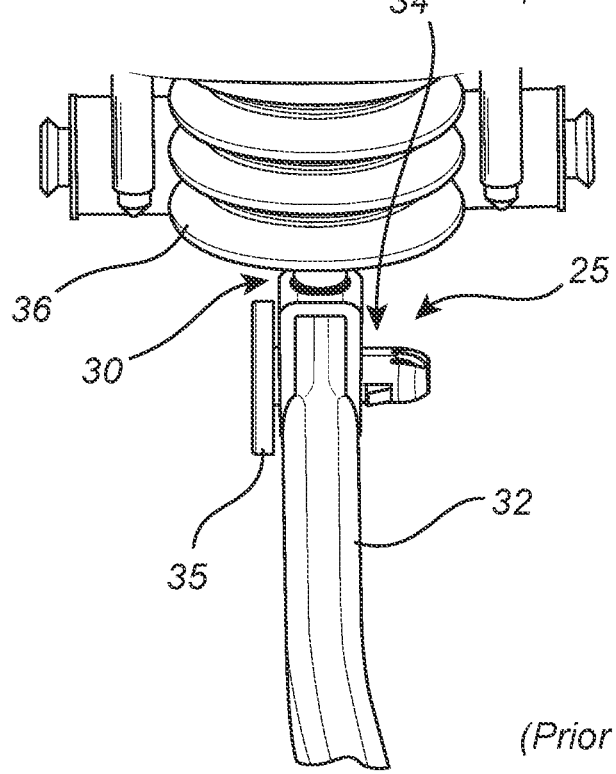
(Prior art) *Fig. 4*

VEHICLE BRAKE PEDAL BOOSTER PUSHROD INTERFACE ASSEMBLY

TECHNICAL FIELD

The present disclosure relates generally to the automotive field. More specifically, the present invention relates to a vehicle brake pedal booster pushrod interface assembly.

BACKGROUND

Typically, in a vehicle, a pivoting brake pedal that is actuatable by a driver to brake the vehicle is coupled to the associated brake booster actuator, whether mechanical or electronic, via a booster pushrod or the like. This brake booster actuator is operable for engaging the brakes of the vehicle with limited brake pedal travel, thereby eliminating a brake pedal that feels "soft" and brakes that exhibit sub-optimal performance.

FIGS. 1 and 2 illustrate a conventional booster pushrod interface assembly 5. Here, one end of an elongate pushrod 10 is coupled to the upper portion of a pivoting brake pedal arm 12, with the other end of the pushrod 10 being adapted to be coupled to an associated brake booster actuator (not illustrated), whether mechanical or electronic. In this case, a ball structure 14, 16 is provided at either end of the pushrod 10 that is configured to securely engage either a socket joint 18 of the associated pivoting brake pedal arm 12 or a socket joint (not illustrated) of the associated brake booster actuator. These ball structures 14, 16 allow the pushrod 10 to transfer translational motion between the pivoting brake pedal arm 12 and the brake booster actuator, while allowing for a degree of pivoting motion. The ball structure 14 at the pivoting brake pedal arm 12 is held in the associated socket joint 18 by any number of plastic or metal clips or brackets 20, such that the ball structure 14 is held securely in the associated socket joint 18, but can pivot and, in the case of vehicle service, be disengaged and replaced along with the pushrod 10. It is apparent that the pushrod interface housing 22 illustrated is somewhat complex, and therefore expensive, and it is relatively difficult for a service technician to disengage/engage the pushrod 10 from/with the pivoting brake pedal arm 12, as sufficient slack must be provided to disengage/engage the ball structure 14 from the associated socket joint 18 and pivot the pushrod 10 out of/into place. This can be a frustrating operation, especially if service technician visibility is limited, given the precise alignments required and the use of the clips and brackets 20.

FIGS. 3 and 4 illustrate another conventional booster pushrod interface assembly 25. Here, one end of an elongate pushrod 30 is again coupled to the upper portion of the pivoting brake pedal arm 32, with the other end of the pushrod 30 being adapted to be coupled to an associated brake booster actuator 31, whether mechanical or electronic. In this case, a clip structure 34 is provided at one end of the pushrod 30 that is configured to securely engage a hole 38 manufactured into the associated pivoting brake pedal arm 32. The other end of the pushrod 30 can be coupled to the associated brake booster actuator 31 by any suitable means and be covered by a boot 36 or the like. This clip structure 34 and coupling means again allow the pushrod 30 to transfer translational motion between the pivoting brake pedal arm 32 and the brake booster actuator 31, while allowing for a degree of pivoting motion. The clip structure 34 at the pivoting brake pedal arm 32 is coupled to the pivoting brake pedal arm 32 using a pin 35, for example, such that the clip structure 34 is securely coupled to the pivoting brake pedal arm 32, but can pivot and, in the case of vehicle service, be disengaged and replaced along with the pushrod 30. It is apparent that the pushrod interface assembly 25 illustrated is somewhat complex, and therefore expensive, and it is again relatively difficult for a service technician to disengage/engage the pushrod 30 from/with the pivoting brake pedal arm 32, as sufficient slack must be provided to disengage/engage the clip structure 34 from the pivoting brake pedal arm 32 and pivot the pushrod 30 out of/into place. This can again be a frustrating operation, especially if service technician visibility is limited, given the precise alignments required and the use of the pin 35.

Thus, what is still needed in the art is an improved booster pushrod interface assembly for coupling a pivoting brake pedal arm to a brake booster actuator that is relatively simple, lightweight, and inexpensive, and that is easy to assemble/disassemble in manufacturing and service applications, especially when assembler/service technician visibility and dexterity is limited by workspace constraints.

SUMMARY

In various exemplary embodiments, the present disclosure provides a vehicle booster pushrod interface assembly that includes a pivoting brake pedal arm incorporating a protruding cylindrical metal peg structure coupled to the upper portion thereof. This protruding cylindrical peg structure is selectively engaged by a c-shaped clip structure that is coupled to the proximal end of the associated elongate pushrod. Because a c-shaped clip structure is used, the pushrod is securable to the protruding cylindrical peg structure of the pivoting brake pedal arm, but may be readily disengaged from (and reengaged with) the protruding cylindrical peg structure. The joint formed allows the pushrod to pivot or rotate with respect to the pivoting brake pedal arm in one plane, while the conventional ball-and-socket joint or the like utilized at the distal end of the pushrod in conjunction with the coupled brake booster actuator allows the pushrod to pivot in at least one other plane with respect to the pivoting brake pedal arm. This arrangement provides a pushrod interface assembly that is relatively simple, lightweight, and inexpensive, and that is easy to assemble/disassemble in manufacturing and service applications, especially when assembler/service technician visibility and dexterity is limited by workspace constraints.

Preferably, the c-shaped clip structure is manufactured from a deflectable metal or plastic material and defines an opening that is more narrow than the peg-retaining portion of the clip structure, allowing the clip structure to be "snapped" onto the metal peg structure. The c-shaped clip structure also utilizes one relatively longer arm and one relatively shorter arm, both of which incorporate an outward-oriented flange, which aides in the location of the clip structure with respect to the peg structure and the "snapping" of the clip structure onto the peg structure. All of these features promote the ease of assembly/disassembly of the pushrod interface assembly in manufacturing and service applications, especially when assembler/service technician visibility and dexterity is limited by workspace constraints. Essentially, "no look" assembly/disassembly is enabled.

Optionally, the peg structure is covered with a cylindrical plastic structure, potentially including an opposed conical section at each end. These opposed conical structures further assist in guiding the clip structure onto and off of the peg structure, especially when assembler/service technician visibility and dexterity is limited by workspace constraints. The end of the peg structure may include a plurality of concentric petal structures or the like adapted to rotatably secure the cylindrical plastic structure to the peg structure.

In one exemplary embodiment, a vehicle brake pedal booster pushrod interface assembly is provided that includes: a pivotable brake pedal arm including a protruding peg structure; and an elongate pushrod including a clip structure disposed at one end thereof and adapted to pivotably engage the protruding peg structure of the pivotable brake pedal arm. The elongate pushrod further includes a ball structure disposed at another end thereof and adapted to pivotably engage a brake booster actuator of the vehicle. The brake pedal booster pushrod interface assembly further includes a cylindrical sleeve adapted to be rotatably disposed about the protruding peg structure of the pivotable brake pedal arm and be pivotably engaged by the clip structure of the elongate pushrod. Optionally, the cylindrical sleeve includes an opposed conical section disposed at either end thereof and separated by a cylindrical center portion. Each of the opposed conical sections is tapered inwards towards the cylindrical center portion of the cylindrical sleeve. Optionally, the protruding peg structure of the pivotable brake pedal arm includes a plurality of concentrically-arranged spring petal structures disposed at an end portion thereof and adapted to rotatably secure the cylindrical sleeve about the peg structure of the pivoting brake petal arm. The clip structure of the elongate pushrod includes a pair of arms defining an opening and an interior space adapted to receive the protruding peg structure of the pivotable brake pedal arm. Optionally, one of the pair of arms is relatively longer than the other of the pair of arms. Each of the pair of arms includes an outwardly-oriented flange. Optionally, the opening defined by the pair of arms has a width that is relatively smaller than a diameter of the interior space defined by the pair of arms.

In another exemplary embodiment, a vehicle pivoting brake pedal arm assembly is provided that includes: an elongate member including an upper portion and lower portion; a protruding peg structure coupled to the upper portion of the elongate member; and a brake pedal coupled to the lower portion of the elongate member; wherein the protruding peg structure is adapted to be pivotably engaged by an elongate pushrod including a clip structure disposed at one end thereof. The protruding peg structure is one of integrally formed with, secured to, and disposed partially through the upper portion of the elongate member. Optionally, the pivoting brake pedal arm assembly further includes a cylindrical sleeve adapted to be rotatably disposed about the protruding peg structure coupled to the upper portion of the elongate arm and be pivotably engaged by the clip structure of the elongate pushrod. Optionally, the cylindrical sleeve includes an opposed conical section disposed at either end thereof and separated by a cylindrical center portion. Each of the opposed conical sections is tapered inwards towards the cylindrical center portion of the cylindrical sleeve. Optionally, the protruding peg structure coupled to the upper portion of the elongate member includes a plurality of concentrically-arranged spring petal structures disposed at an end portion thereof and adapted to rotatably secure the cylindrical sleeve about the peg structure coupled to the upper portion of the elongate member.

In a further exemplary embodiment, a vehicle brake pedal booster pushrod assembly is provided that includes an elongate pushrod; and a clip structure disposed at one end of the elongate pushrod and adapted to pivotably engage a protruding peg structure coupled to a pivotable brake pedal arm. Optionally, the elongate pushrod includes a ball structure disposed at another end of the elongate pushrod opposite the clip structure and adapted to pivotably engage a brake booster actuator of the vehicle. Optionally, the peg structure includes a cylindrical sleeve adapted to be rotatably disposed about the protruding peg structure of the pivotable brake pedal arm and be pivotably engaged by the clip structure. The cylindrical sleeve includes an opposed conical section disposed at either end thereof and separated by a cylindrical center portion. Each of the opposed conical sections is tapered inwards towards the cylindrical center portion of the cylindrical sleeve. The clip structure includes a pair of arms defining an opening and an interior space adapted to receive the protruding peg structure of the pivotable brake pedal arm. Optionally, one of the pair of arms is relatively longer than the other of the pair of arms. Optionally, each of the pair of arms includes an outwardly-oriented flange. The opening defined by the pair of arms has a width that is relatively smaller than a diameter of the interior space defined by the pair of arms.

BRIEF DESCRIPTION OF THE DRAWINGS

The present disclosure is illustrated and described with reference to the attached drawings, in which like reference numbers are used to denote like assembly/part components, as appropriate, and in which:

FIG. 1 is a perspective view of one conventional booster pushrod interface assembly, utilizing a ball-and-socket joint;

FIG. 2 is a partial cross-sectional planar view of the conventional booster pushrod interface assembly of FIG. 1;

FIG. 3 is a planar view of another conventional booster pushrod interface assembly, utilizing a clip-and-pin joint;

FIG. 4 is another planar view of the conventional booster pushrod interface assembly of FIG. 3;

DESCRIPTION OF EMBODIMENTS

Figure 5:
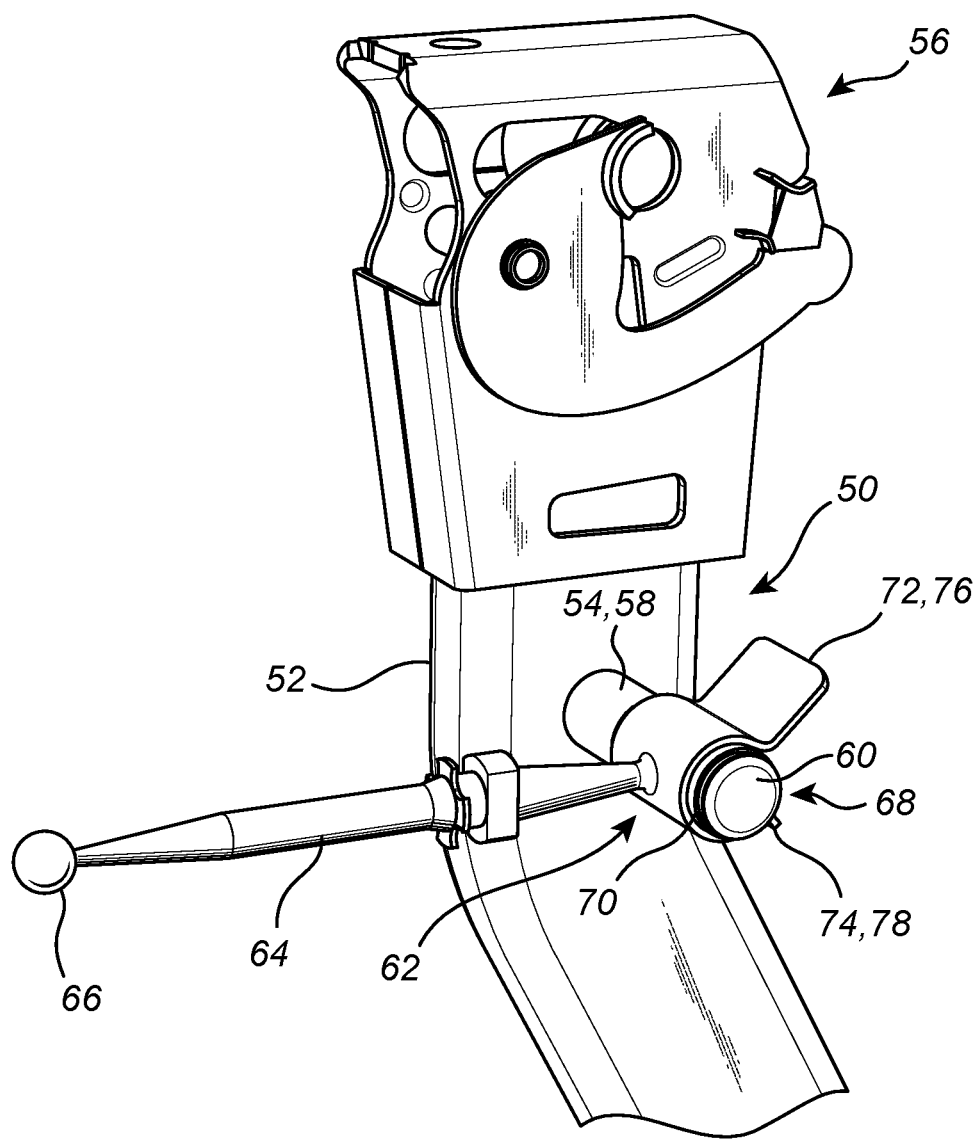
FIG. 5 is a perspective view of one exemplary embodiment of the booster pushrod interface assembly of the present disclosure, utilizing a protruding pedal peg structure and an associated c-shaped pushrod clip structure.

Referring now specifically to FIG. 5, in one exemplary embodiment, the vehicle brake pedal booster pushrod interface assembly 50 of the present disclosure includes a pivoting metal brake pedal arm 52 incorporating a protruding cylindrical metal (or plastic) peg structure 54 coupled to the upper portion thereof. As illustrated, the pivoting brake pedal arm 52 includes an upper portion and a lower portion optionally disposed at an angle to the upper portion. A conventional brake pedal (not illustrated) is coupled to the lower portion of the pivoting brake pedal arm 52 and is actuatable by a driver to brake the vehicle. The upper portion of the pivoting brake pedal arm 52 is coupled to a conventional pivoting actuation assembly 56 that is adapted to allow the pivoting brake pedal arm 52 to pivot downward and forward when the brake pedal is actuated by the driver, and then rebound upward and rearward when released by the driver, actuating the brakes of the vehicle. The peg structure 54 may be coupled to, integrally formed with, or disposed through and secured to the upper portion of the pivoting brake pedal arm 52 and may have any suitable cross-sectional shape, with a cylindrical shape being illustrated. For example, the peg structure 54 may be disposed through a hole manufactured into the pivoting brake pedal arm 52 and then welded, bonded, fastened, or otherwise secured to the pivoting brake pedal arm 52. Optionally, the peg structure 52 is circumferentially enclosed within a cylindrical plastic sleeve 58 or the like that may freely rotate about the peg structure 52. The cylindrical sleeve 58 is retained on the peg structure 54 via a plurality of concentrically-arranged retention petal spring structures 60 disposed around the end portion of the peg structure 52. It will be readily apparent to those of ordinary skill in the art that other suitable retention structures/means may also be utilized.

The protruding cylindrical peg structure 52 is selectively engaged by a c-shaped clip structure 62 that is coupled to the proximal end of the associated elongate pushrod 64. This clip structure 62 may be removably coupled to or integrally formed with the pushrod 64. Because a c-shaped clip structure 62 is used, the pushrod 64 is securable to the protruding cylindrical peg structure 54 of the pivoting brake pedal arm 52, but may be readily disengaged from (and reengaged with) the protruding cylindrical peg structure 54. The joint formed allows the pushrod 64 to pivot or rotate with respect to the pivoting brake pedal arm 52 in one plane.

A conventional ball structure 66 or the like is utilized at the distal end of the pushrod 64 in conjunction with the coupled brake booster actuator (not illustrated) and allows the pushrod 64 to pivot in at least one other plane with respect to the pivoting brake pedal arm 52. This arrangement provides a pushrod interface assembly 50 that is relatively simple, lightweight, and inexpensive, and that is easy to assemble/disassemble in manufacturing and service applications, especially when assembler/service technician visibility and dexterity is limited by workspace constraints. As illustrated, the pushrod 64 has a substantially cylindrical shape with tapered end portions, although other suitable cross-sectional configurations may be utilized as well.

Preferably, the c-shaped clip structure 62 is manufactured from a deflectable metal or plastic material and defines an opening 68 that is more narrow than the peg-retaining portion 70 of the clip structure 62, allowing the clip structure 62 to be "snapped" onto the metal peg structure 54. The c-shaped clip structure 62 also utilizes one relatively longer arm 72 and one relatively shorter arm 74, both of which incorporate an outward-oriented flange 76,78, which aides in the location of the clip structure 62 with respect to the peg structure 54 and the "snapping" of the clip structure 62 onto the peg structure 54. In the exemplary embodiment illustrated, the relatively longer arm 72 is the upper arm and the relatively shorter arm 74 is the lower arm, and the peg retaining portion 70 of the clip structure 62 has an inside diameter that is about equal to the outside diameter of the peg structure 54 and/or cylindrical sleeve 58. The relatively longer arm 72 includes a coextensive flange 76, while the relatively shorter arm 74 includes a flared flange 78 that is disposed at an angle to the rest of the relatively shorter arm 74. All of these features promote the ease of assembly/disassembly of the pushrod interface assembly 50 in manufacturing and service applications, especially when assembler/service technician visibility and dexterity is limited by workspace constraints. Essentially, "no look" assembly/disassembly is enabled.

Figure 6:
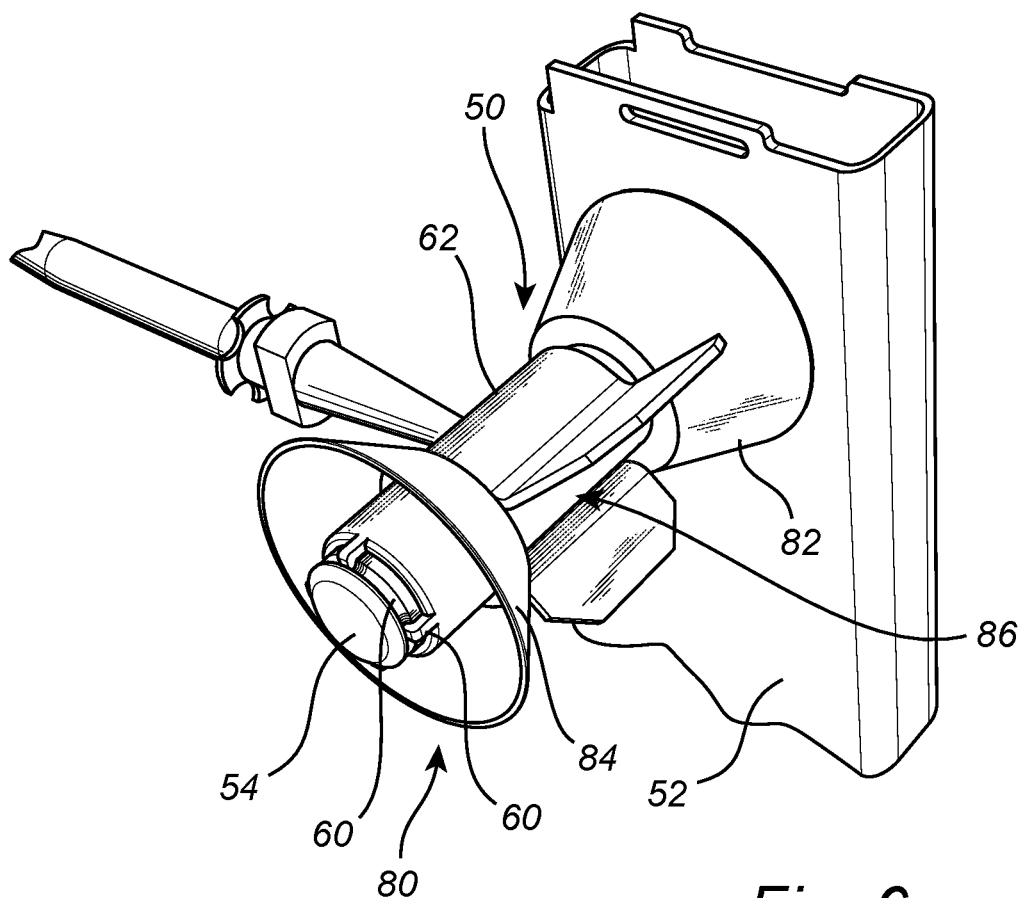
FIG. 6 is a perspective view of another exemplary embodiment of the booster pushrod interface assembly of the present disclosure, utilizing a protruding pedal peg structure, a dual-conical peg guide, and an associated c-shaped pushrod clip structure.

Referring now specifically to FIG. 6, in another exemplary embodiment, the peg structure 54 is covered with a cylindrical plastic structure 80 including an opposed conical section 82,84 at each end. These opposed conical structures 82,84 further assist in guiding the clip structure 62 onto and off of the peg structure 54, especially when assembler/service technician visibility and dexterity is limited by workspace constraints. The end of the peg structure 54 includes a plurality of concentric petal structures 60 or the like adapted to rotatably secure the cylindrical plastic structure 80 to the peg structure 54. As illustrated, the inner conical section 82 disposed adjacent to the pivotable brake pedal arm 52 has a relatively greater height and narrows away from the pivotable brake pedal arm 52 and towards the center portion 86 of the peg structure 54, while the outer conical section 84 disposed remote from the pivotable brake pedal arm 52 has a relatively lesser height and narrows towards the pivotable brake pedal arm 52 and towards the center portion 86 of the peg structure 54. The center portion 86 of the cylindrical plastic structure 80 has a substantially cylindrical (or other) shape suitable for engagement with the clip structure 62. The cylindrical plastic structure 80 may be substantially hollow, such that the weight of the cylindrical plastic structure 80 is minimized.

Figure 7:
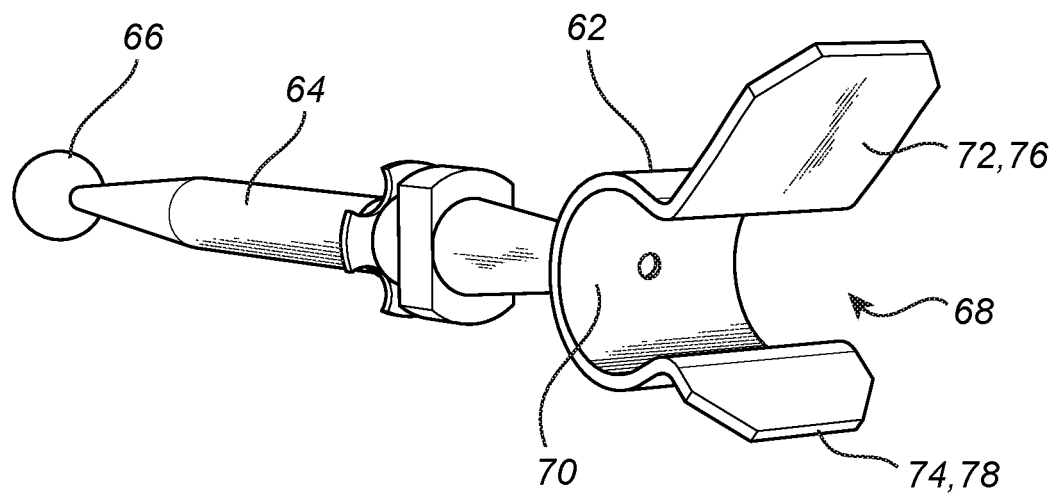
FIG. 7 is a perspective view of one exemplary embodiment of the booster pushrod of the present disclosure, utilizing the c-shaped pushrod clip structure.

As illustrated in FIG. 7, a conventional ball structure 66 or the like is utilized at the distal end of the pushrod 64 in conjunction with the coupled brake booster actuator (not illustrated) and allows the pushrod 64 to pivot in at least one other plane with respect to the pivoting brake pedal arm 52 (FIGS. 5 and 6). This arrangement provides a pushrod interface assembly 50 (FIGS. 5 and 6) that is relatively simple, lightweight, and inexpensive, and that is easy to assemble/disassemble in manufacturing and service applications, especially when assembler/service technician visibility and dexterity is limited by workspace constraints. As illustrated, the pushrod 64 has a substantially cylindrical shape with tapered end portions, although other suitable cross-sectional configurations may be utilized as well. The pushrod 64 may be assembled from any number of joinable sections, joined by threaded sections, rotatable locking connectors, and/or the like.

Preferably, the c-shaped clip structure 62 is manufactured from a deflectable metal or plastic material and defines an opening 68 that is more narrow than the peg-retaining portion 70 of the clip structure 62, allowing the clip structure 62 to be "snapped" onto the metal peg structure 54 (FIGS. 5 and 6). The c-shaped clip structure 62 also utilizes one relatively longer arm 72 and one relatively shorter arm 74, both of which incorporate an outward-oriented flange 76,78, which aides in the location of the clip structure 62 with respect to the peg structure 54 and the "snapping" of the clip structure 62 onto the peg structure 54. In the exemplary embodiment illustrated, the relatively longer arm 72 is the upper arm and the relatively shorter arm 74 is the lower arm, and the peg retaining portion 70 of the clip structure 62 has an inside diameter that is about equal to the outside diameter of the peg structure 54 and/or cylindrical sleeve 58 (FIG. 5) and/or center portion 86 (FIG. 6) of the cylindrical plastic structure 80 (FIG. 6). The relatively longer arm 72 includes a coextensive flange 76, while the relatively shorter arm 74 includes a flared flange 78 that is disposed at an angle to the rest of the relatively shorter arm 74. All of these features promote the ease of assembly/disassembly of the pushrod interface assembly 50 in manufacturing and service applications, especially when assembler/service technician visibility and dexterity is limited by workspace constraints. Essentially, "no look" assembly/disassembly is enabled.

Figure 8:
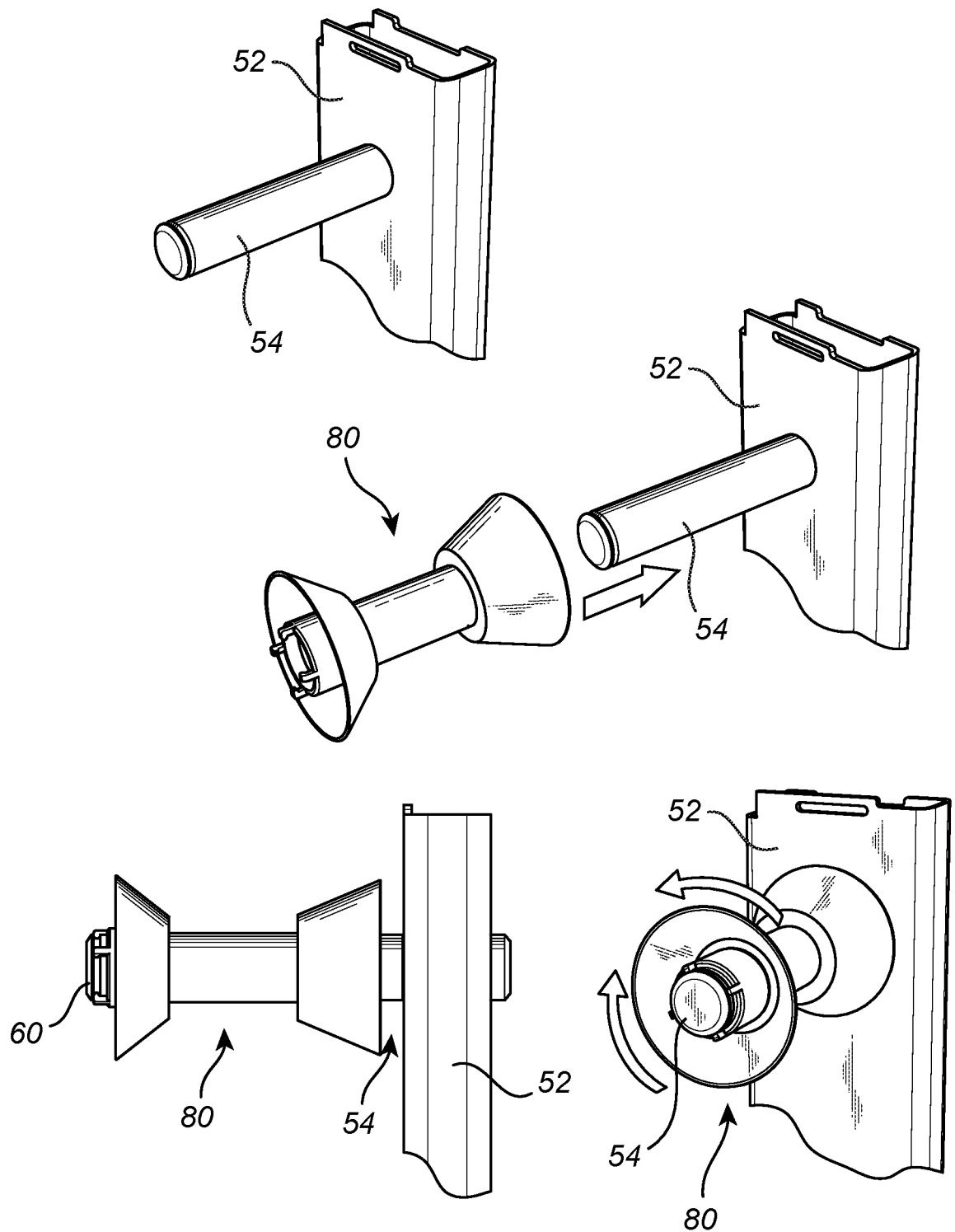
FIG. 8 is series of perspective and planar views illustrating the assembly of the dual-conical peg guide onto the protruding pedal peg structure such that the dual-conical peg guide is rotatable on the protruding pedal peg structure.

FIG. 8 illustrates the translational insertion of the dual-conical cylindrical structure 80 onto the peg structure 54 coupled to the pivotable brake pedal arm 52, with the concentric petal structures 60 (or another clip retainer) securing the dual-conical cylindrical structure 80 on the peg structure 54. Once installed, the dual-conical cylindrical structure 80 is rotatable about the peg structure 54 and can only be removed with disengagement of the concentric petal structures 60 (or other clip retainer) from the dual-conical cylindrical structure 80.

Figure 9:
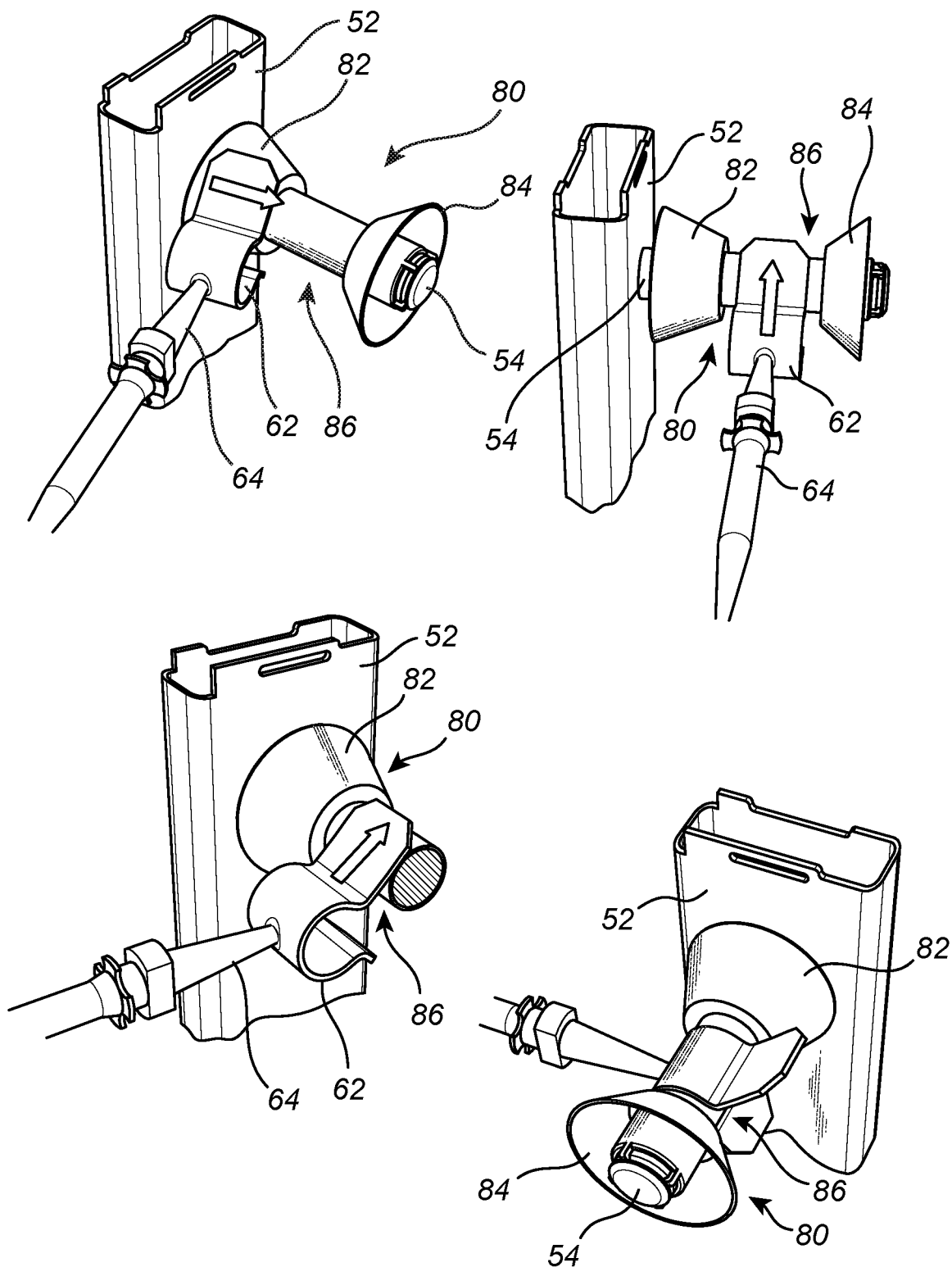
FIG. 9 is series of perspective views illustrating the assembly of the c-shaped pushrod clip structure onto the dual-conical peg guide and the protruding pedal peg structure such that the c-shaped pushrod clip structure is pivotable on the dual-conical peg guide and the protruding pedal peg structure.

FIG. 9 illustrates the attachment of the pushrod 64 and clip structure 62 to the peg structure 54 and cylindrical plastic structure 80. It will be readily apparent to those of ordinary skill in the art that a reverse removal process can also be employed. First, the pushrod 64 and clip structure 62 are angled such that the clip structure 62 engages the inner cone 82 of the cylindrical plastic structure 80. The clip structure is then straightened and translated towards and about the center portion 86 of the cylindrical plastic structure 80. The outer cone 84 of the cylindrical plastic structure 80 acts as a stop to over-translation of the clip structure 62. Once in place, the clip structure 62 holds the pushrod 64 in a proper operational alignment, while allowing the pushrod 64 to pivot about the peg structure 54.

Thus, the present disclosure provides a vehicle booster pushrod interface assembly that includes a pivoting brake pedal arm incorporating a protruding cylindrical metal peg structure coupled to the upper portion thereof. This protruding cylindrical peg structure is selectively engaged by a c-shaped clip structure that is coupled to the proximal end of the associated elongate pushrod. Because a c-shaped clip structure is used, the pushrod is securable to the protruding cylindrical peg structure of the pivoting brake pedal arm, but may be readily disengaged from (and reengaged with) the protruding cylindrical peg structure. The joint formed allows the pushrod to pivot or rotate with respect to the pivoting brake pedal arm in one plane, while the conventional ball-and-socket joint or the like utilized at the distal end of the pushrod in conjunction with the coupled brake booster actuator allows the pushrod to pivot in at least one other plane with respect to the pivoting brake pedal arm. This arrangement provides a pushrod interface assembly that is relatively simple, lightweight, and inexpensive, and that is easy to assemble/disassemble in manufacturing and service applications, especially when assembler/service technician visibility and dexterity is limited by workspace constraints.

Preferably, the c-shaped clip structure is manufactured from a deflectable metal or plastic material and defines an opening that is more narrow than the peg-retaining portion of the clip structure, allowing the clip structure to be "snapped" onto the metal peg structure. The c-shaped clip structure also utilizes one relatively longer arm and one relatively shorter arm, both of which incorporate an outward-oriented flange, which aides in the location of the clip structure with respect to the peg structure and the "snapping" of the clip structure onto the peg structure. All of these features promote the ease of assembly/disassembly of the pushrod interface assembly in manufacturing and service applications, especially when assembler/service technician visibility and dexterity is limited by workspace constraints. Essentially, "no look" assembly/disassembly is enabled.

Optionally, the peg structure is covered with a cylindrical plastic structure, potentially including an opposed conical section at each end. These opposed conical structures further assist in guiding the clip structure onto and off of the peg structure, especially when assembler/service technician visibility and dexterity is limited by workspace constraints. The end of the peg structure may include a plurality of concentric petal structures or the like adapted to rotatably secure the cylindrical plastic structure to the peg structure.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope if the present disclosure, are contemplated thereby, and are intended to be covered by the following non-limiting claims for all purposes.

What is claimed is:

1. A vehicle brake pedal booster pushrod interface assembly, comprising:
   a pivotable brake pedal arm comprising a protruding peg structure;
   an elongate pushrod comprising a clip structure disposed at one end thereof and adapted to pivotably engage the protruding peg structure of the pivotable brake pedal arm; and
   a cylindrical sleeve adapted to be rotatably disposed about the protruding peg structure of the pivotable brake pedal arm and be pivotably engaged by the clip structure of the elongate pushrod, wherein the cylindrical sleeve comprises an opposed conical section disposed at either end thereof and separated by a cylindrical center portion.

2. The brake pedal booster pushrod interface assembly of claim 1, wherein the elongate pushrod further comprises a ball structure disposed at another end thereof and adapted to pivotably engage a brake booster actuator of the vehicle.

3. The brake pedal booster pushrod interface assembly of claim 1, wherein each of the opposed conical sections is tapered inwards towards the cylindrical center portion of the cylindrical sleeve.

4. The brake pedal booster pushrod interface assembly of claim 1, wherein the protruding peg structure of the pivotable brake pedal arm comprises a plurality of concentrically-arranged spring structures disposed at an end portion thereof and adapted to rotatably secure the cylindrical sleeve about the protruding peg structure of the pivotable brake pedal arm.

5. The brake pedal booster pushrod interface assembly of claim 1, wherein the clip structure of the elongate pushrod comprises a pair of arms defining an opening and an interior space adapted to receive the protruding peg structure of the pivotable brake pedal arm.

6. The brake pedal booster pushrod interface assembly of claim 5, wherein one of the pair of arms is longer than the other of the pair of arms.

7. The brake pedal booster pushrod interface assembly of claim 5, wherein each of the pair of arms comprises an outwardly-oriented flange.

8. The brake pedal booster pushrod interface assembly of claim 5, wherein the opening defined by the pair of arms has a width that is smaller than a diameter of the interior space defined by the pair of arms.

9. A vehicle pivoting brake pedal arm assembly, comprising:
   an elongate member comprising an upper portion and lower portion;
   a protruding peg structure coupled to the upper portion of the elongate member;
   a brake pedal coupled to the lower portion of the elongate member;
   wherein the protruding peg structure is adapted to be pivotably engaged by an elongate pushrod including a clip structure disposed at one end thereof; and
   a cylindrical sleeve adapted to be rotatably disposed about the protruding peg structure coupled to the upper portion of the elongate arm and be pivotably engaged by the clip structure of the elongate pushrod, wherein the cylindrical sleeve comprises an opposed conical section disposed at either end thereof and separated by a cylindrical center portion.

10. The pivoting brake pedal arm assembly of claim 9, wherein the protruding peg structure is one of integrally formed with, secured to, and disposed partially through the upper portion of the elongate member.

11. The pivoting brake pedal arm assembly of claim 9, wherein each of the opposed conical sections is tapered inwards towards the cylindrical center portion of the cylindrical sleeve.

12. A vehicle brake pedal booster pushrod assembly, comprising:
   an elongate pushrod; and
   a clip structure disposed at one end of the elongate pushrod and adapted to pivotably engage a protruding peg structure coupled to a pivotable brake pedal arm;
   where the protruding peg structure includes a cylindrical sleeve adapted to be rotatably disposed about the protruding peg structure of the pivotable brake pedal arm and be pivotably engaged by the clip structure, and where the cylindrical sleeve includes an opposed conical section disposed at either end thereof and separated by a cylindrical center portion.

13. The brake pedal booster pushrod assembly of claim 12, wherein the elongate pushrod comprises a ball structure disposed at another end of the elongate pushrod opposite the clip structure and adapted to pivotally engage a brake booster actuator of the vehicle.

14. The brake pedal booster pushrod assembly of claim 12, where each of the opposed conical sections is tapered inwards towards the cylindrical center portion of the cylindrical sleeve.

15. The brake pedal booster pushrod assembly of claim 12, wherein the clip structure comprises a pair of arms defining an opening and an interior space adapted to receive the protruding peg structure of the pivotable brake pedal arm.

16. The brake pedal booster pushrod assembly of claim 15, wherein one of the pair of arms is longer than the other of the pair of arms.

17. The brake pedal booster pushrod assembly of claim 15, wherein each of the pair of arms comprises an outwardly-oriented flange.

18. The brake pedal booster pushrod assembly of claim 15, wherein the opening defined by the pair of arms has a width that is smaller than a diameter of the interior space defined by the pair of arms.

* * * * *